US012786180B2

(12) United States Patent
Samineni

(10) Patent No.: US 12,786,180 B2
(45) Date of Patent: Nov. 3, 2026

(54) DIGITAL IDENTITY ALLOCATION, ASSIGNMENT, AND MANAGEMENT

(71) Applicant: Passbird Research, Inc., Sunnyvale, CA (US)

(72) Inventor: Naga Rohit Samineni, Sunnyvale, CA (US)

(*) Notice: Subject to any disclaimer, the term of this patent is extended or adjusted under 35 U.S.C. 154(b) by 99 days.

(21) Appl. No.: 19/036,239

(22) Filed: Jan. 24, 2025

(65) Prior Publication Data

US 2026/0006014 A1 Jan. 1, 2026

Related U.S. Application Data

(63) Continuation of application No. PCT/US2023/071152, filed on Jul. 27, 2023.

(60) Provisional application No. 63/392,720, filed on Jul. 27, 2022.

(51) Int. Cl.

*H04L 9/40* (2022.01)
*H04L 9/08* (2006.01)

(52) U.S. Cl.

CPC ............ *H04L 63/08* (2013.01); *H04L 9/0861* (2013.01)

(58) Field of Classification Search

CPC .......... G06F 21/64; G06F 21/32; G06F 21/34; G06F 21/36; G06F 21/602; H04L 63/08; H04L 9/0861

USPC ............................................................ 726/4

See application file for complete search history.

(56) References Cited

U.S. PATENT DOCUMENTS

| | | | | |
|---|---|---|---|---|
| 8,948,392 | B2 * | 2/2015 | Chassagne .............. | G01S 19/09 713/172 |
| 10,742,422 | B1 | 8/2020 | Jarjoui et al. | |
| 11,853,438 | B2 * | 12/2023 | Gorog ................... | G06F 21/602 |
| 2009/0083544 | A1 | 3/2009 | Scholnick et al. | |
| 2017/0244568 | A1 * | 8/2017 | Brickell .............. | H04W 12/041 |
| 2019/0342079 | A1 | 11/2019 | Rudzitis et al. | |
| 2020/0092269 | A1 * | 3/2020 | Le Saint ............... | H04L 9/0841 |

(Continued)

FOREIGN PATENT DOCUMENTS

| | | | |
|---|---|---|---|
| WO | 2021041746 | A1 | 3/2021 |
| WO | 2024026428 | A1 | 2/2024 |

OTHER PUBLICATIONS

ISA/US, PCT Application No. PCT/US23/71152, International Search Report and Written Opinion dated Nov. 9, 2023, 11 pages.

(Continued)

*Primary Examiner* — Amare F Tabor
(74) *Attorney, Agent, or Firm* — Bass Patent Law, LLC

(57) ABSTRACT

The present teachings include computer program products, systems, methods, and platforms for the assignment, distribution, allocation, authentication, and authorization of cryptographic digital identities. This may include automatic digital identity creation—without requiring prior authentication or proof of ownership by an entity—and/or usage of such digital identities. That is, in aspects, the obtaining of unique identifiers and/or the generation of cryptographic secrets therefore may be accomplished without authentication by the identified entity and/or any other entity. For example, a platform according to the present teachings may be granted access by a third-party platform for retrieval of unique identifiers associated with users of the third-party platform, where an aspect of the present teachings automatically creates digital identities and associated cryptographic secrets for these users.

20 Claims, 3 Drawing Sheets

(56) References Cited

U.S. PATENT DOCUMENTS

| | | | |
|---|---|---|---|
| 2020/0259656 | A1 | 8/2020 | Sundaresan et al. |
| 2022/0014354 | A1 * | 1/2022 | Valladolid ............. H04L 9/3271 |

OTHER PUBLICATIONS

ISA/US, PCT Application No. PCT/US23/71152, International Preliminary Report on Patentability dated Feb. 6, 2025, 10 pages.

* cited by examiner

DIGITAL IDENTITY ALLOCATION, ASSIGNMENT, AND MANAGEMENT

CROSS-REFERENCE TO RELATED APPLICATIONS

This application is a bypass continuation that claims priority to International Patent App. No. PCT/US2023/071152 filed on Jul. 27, 2023, which claims priority to U.S. Provisional Application No. 63/392,720 filed on Jul. 27, 2022, where the entire contents of each of the foregoing are hereby incorporated by reference herein.

TECHNICAL FIELD

The present disclosure generally relates to cryptography, and, more specifically, to devices, systems, methods, and computer program products for cryptographic digital identity allocation, assignment, and management.

BACKGROUND

There remains a need for a platform providing, inter alia, the assignment, distribution, allocation, authentication, and authorization of identities in the domain of applied cryptography such as blockchains, decentralized systems, and the applications and software built that take advantage of them.

SUMMARY

The present teachings include computer program products, systems, methods, and platforms for the assignment, distribution, allocation, authentication, and authorization of cryptographic digital identities. In particular, the present teachings may include a technique for automatic digital identity creation (and/or retrieval, e.g., when a digital identity already exists)—for example, without requiring prior authentication by an entity—and/or usage of such digital identities. Obtaining the unique identifier and/or the generation of cryptographic secrets therefore may be done without authentication (such as, for example, proof of ownership or other similar authentication) by the identified entity and/or any other entity. In some aspects, a platform according to the present teachings may interact with a third-party platform for retrieval of one or more unique identifiers associated with users of the third-party platform. The present teachings may include algorithmically generating a first cryptographic secret and associating the first cryptographic secret with the unique identifier, and algorithmically generating a second cryptographic secret for the first cryptographic secret (e.g., where the second cryptographic secret may be mathematically related to the first cryptographic secret-such as for decrypting data encrypted via the second cryptographic secret, and/or creating a digital signature that is verifiable using the second cryptographic secret). The present teachings may be advantageously applied, for example, to significantly simplify the user experience when interacting with cryptographic systems such as blockchain applications, to provide for the secure transfer of blockchain based assets between two entities on blockchain, and/or the secure transfer of sensitive data records such as those exchanged between medical service providers, and/or to automatically provide for secure data transmission between a sender and a recipient, such as in an email application.

In an aspect, a computer program product for automatically generating digital identities disclosed herein may include computer executable code embodied in a non-transitory computer readable medium that, when executing on one or more computing devices, performs the steps of: obtaining a unique identifier representing a unique identity of an entity without prior authentication of the unique identity by the entity; algorithmically generating a first cryptographic secret and associating the first cryptographic secret with the unique identifier; algorithmically generating a second cryptographic secret for the first cryptographic secret, the second cryptographic secret configured to be publicly shareable, the first cryptographic secret mathematically related to the second cryptographic secret to (i) decrypt data encrypted via the second cryptographic secret, and/or (ii) create a digital signature that is verifiable using the second cryptographic secret. The computer program product may also include code that performs the step of securely storing the first cryptographic secret. Other embodiments of this aspect include corresponding computer systems, apparatus, and computer programs recorded on one or more computer storage devices, each configured to perform the actions of the methods disclosed herein. Other embodiments of this aspect also or instead include a method performing one of more of the aforementioned steps. Other embodiments of this aspect also or instead include a system having a data network, a database coupled to the data network, a plurality of processors coupled to the data network, and a remote computing resource coupled to the data network, the remote computing resource including a processor and a memory, the memory storing code executable by the processor to perform one of more of the aforementioned steps.

Implementations may include one or more of the following features. Authentication by the entity may be deferred until use of the first cryptographic secret for either decrypting data encrypted via the second cryptographic secret or signing the digital signature. The computer program product may further include computer executable code that, when executing on one or more computing devices, performs the step of providing the second cryptographic secret to a user without prior authentication from the user. The computer program product may include computer executable code that, when executing on one or more computing devices, performs the step of receiving authentication of the unique identifier by the entity when use of the first cryptographic secret is requested. Authentication may include use of an authentication tool. The authentication tool may include one or more of: a one-time password (OTP) provided to the entity, a prompt on a graphical user interface, and establishing one or more cryptographic proofs. The computer program product may include computer executable code that, when executing on one or more computing devices, performs the steps of providing the entity with a computer-implemented challenge for authentication, and, upon receipt of completion of the computer-implemented challenge, permitting verification of the digital signature by the entity using the second cryptographic secret. The computer program product may include computer executable code that, when executing on one or more computing devices, performs the step of reviewing one or more databases to determine whether the unique identifier is already associated with a cryptographic secret. The entity may be at least one of an individual, a corporate entity, a device, and a system. The entity may be a user of a third-party platform. The unique identifier may include at least one of an email address, a phone number, a social security number, a part number, and a device identity. Generating the first cryptographic secret may include use of metadata obtained from one or more of the entity and a user associated with the entity. The first cryptographic secret may be an executable based on the metadata. The executable may be able to operate only after authentication by the entity. The executable, while operating, may be able to demonstrate to other executables, entities, programs, or systems that an operation performed is inspectable to have been performed by the owner of the second cryptographic secret. The first cryptographic secret may include a private key. The first cryptographic secret may be derived from the unique identifier. The first cryptographic secret may be one of a plurality of first cryptographic secrets generated and associated with the unique identifier. Each of the plurality of first cryptographic secrets may be used to algorithmically generate corresponding second cryptographic secrets. Each of the corresponding second cryptographic secrets may be used to algorithmically generate corresponding third cryptographic secrets. At least one of the plurality of first cryptographic secrets may be used to algorithmically generate a plurality of second cryptographic secrets. Association between the first cryptographic secret and the unique identifier may include one or more of storage on a shared database, a digital ledger, a distributed computing network, and a blockchain. The first cryptographic secret and the unique identifier may be cryptographically bound using a scheme including at least one of a digital signature algorithm and an encryption algorithm. The first cryptographic secret may be stored on one or more of a hardware security module and a software-based key store. The first cryptographic secret may be maintained in a trusted execution environment (TEE) for storage and processing thereof. The first cryptographic secret may be stored on a secure element of a computing device associated with a user. The computing device may be a smartphone. The user may be the entity. The computer program product may include computer executable code that, when executing on one or more computing devices, performs the step of storing the second cryptographic secret. Implementations of the described techniques may include hardware, a method or process, computer software on a computer-accessible medium, and a system.

In an aspect, a computer program product for managing digital identities for data protection disclosed herein may include computer executable code embodied in a non-transitory computer readable medium that, when executing on one or more computing devices, performs the steps of: receiving a request for data encryption for securing data associated with an entity for transmission of the data from a sender to a recipient; obtaining a unique identifier associated with the entity without receiving an authentication action by the entity to authenticate the unique identifier; algorithmically generating a first cryptographic secret and associating the first cryptographic secret with the unique identifier; algorithmically generating a second cryptographic secret for the first cryptographic secret; securely storing the first cryptographic secret; before transmission of the data to the recipient, creating encrypted data by encrypting the data associated with the entity using the second cryptographic secret; after transmission of the encrypted data to the recipient, providing an authentication tool for the entity to authorize decryption of the encrypted data using the first cryptographic secret; and, upon receipt of an authentication by the entity using the authentication tool, decrypting the encrypted data using the first cryptographic secret thereby providing the recipient with access to the data associated with the entity. Other embodiments of this aspect include corresponding computer systems, apparatus, and computer programs recorded on one or more computer storage devices, each configured to perform the actions of the methods disclosed herein. Other embodiments of this aspect also or instead include a method performing one of more of the aforementioned steps. Other embodiments of this aspect also or instead include a system having a data network, one or more processors coupled to the data network, and a remote computing resource coupled to the data network, the remote computing resource including a processor and a memory, the memory storing code executable by the processor to perform one of more of the aforementioned steps.

Implementations may include one or more of the following features. The entity may be an individual. The data may include medical records, where at least one of the sender and the recipient includes a medical office. The computer program product may include computer executable code that, when executing on one or more computing devices, performs the steps of receiving the second cryptographic secret, and re-encrypting the data associated with the entity using the second cryptographic secret. The computer program product may include computer executable code that, when executing on one or more computing devices, performs the step of providing the second cryptographic secret to the sender for encrypting the data associated with the entity. The second cryptographic secret may be configured to be publicly shareable. The first cryptographic secret may be mathematically related to the second cryptographic secret to decrypt data encrypted via the second cryptographic secret. The first cryptographic secret may be mathematically related to the second cryptographic secret to create a digital signature that is verifiable using the second cryptographic secret. The authentication tool may include a one-time password (OTP) for the entity, where authentication via the OTP provides authorization for decrypting the encrypted data. The authentication tool may include a prompt on a graphical user interface. Implementations of the described techniques may include hardware, a method or process, computer software on a computer-accessible medium, and a system.

These and other features, aspects, and advantages of the present teachings will become better understood with reference to the following description, examples, and appended claims.

BRIEF DESCRIPTION OF THE DRAWINGS

The foregoing and other objects, features and advantages of the devices, systems, and methods described herein will be apparent from the following description of particular embodiments thereof, as illustrated in the accompanying drawings. The drawings are not necessarily to scale, emphasis instead being placed upon illustrating the principles of the devices, systems, and methods described herein. In the drawings, like reference numerals generally identify corresponding elements.

DETAILED DESCRIPTION

Figure 1:
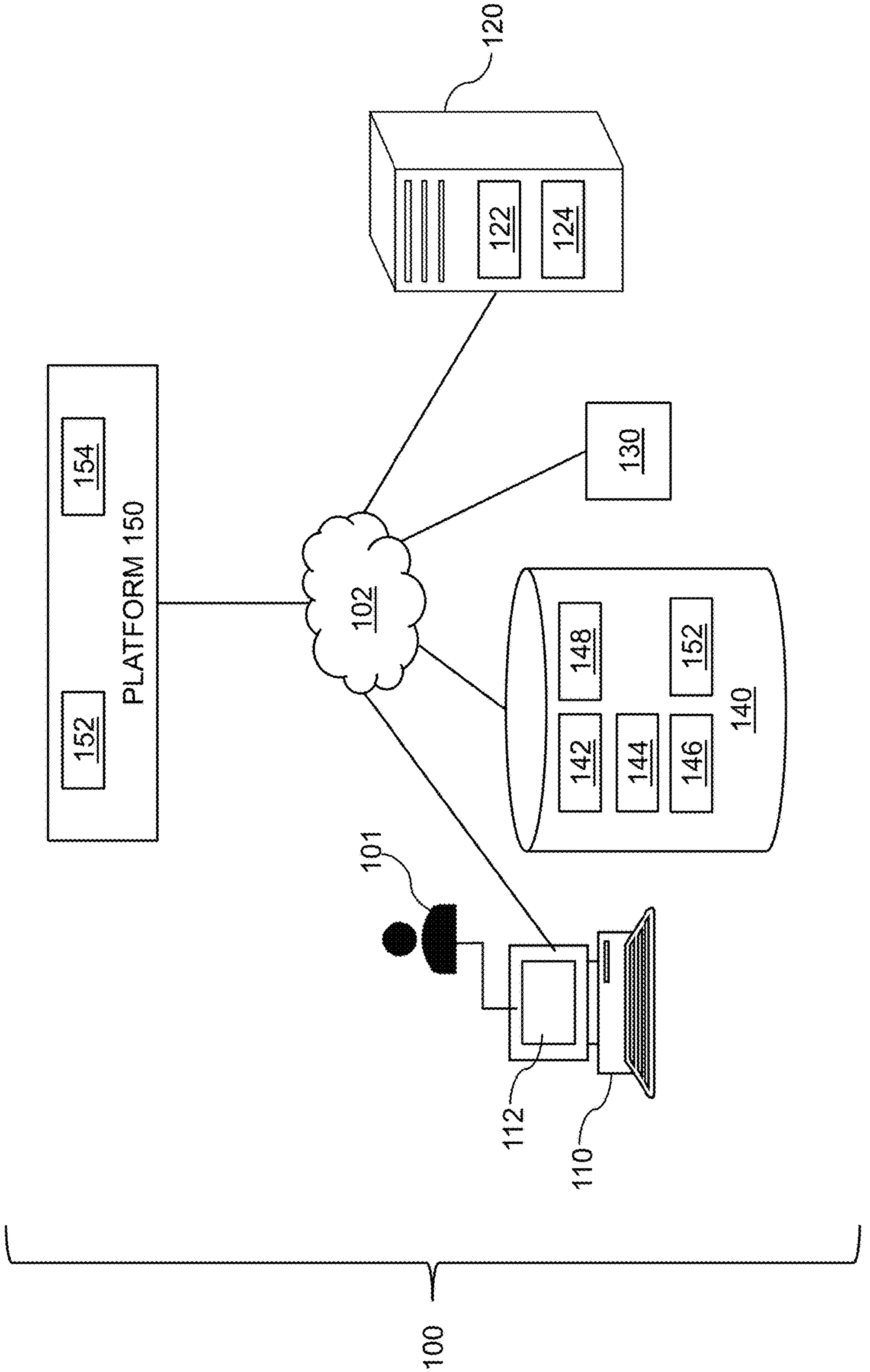
FIG. 1 shows a system for digital identity allocation, assignment, and management, in accordance with a representative embodiment.

The embodiments will now be described more fully hereinafter with reference to the accompanying figures, in which preferred embodiments are shown. The foregoing may, however, be embodied in many different forms and should not be construed as limited to the illustrated embodiments set forth herein. Rather, these illustrated embodiments are provided so that this disclosure will convey the scope to those skilled in the art.

All documents mentioned herein are hereby incorporated by reference in their entirety. References to items in the singular should be understood to include items in the plural, and vice versa, unless explicitly stated otherwise or clear from the text. Grammatical conjunctions are intended to express any and all disjunctive and conjunctive combinations of conjoined clauses, sentences, words, and the like, unless otherwise stated or clear from the context. Thus, the term “or” should generally be understood to mean “and/or” and so forth.

Recitation of ranges of values herein are not intended to be limiting, referring instead individually to any and all values falling within the range, unless otherwise indicated herein, and each separate value within such a range is incorporated into the specification as if it were individually recited herein. The words “about,” “approximately” or the like, when accompanying a numerical value, are to be construed as indicating a deviation as would be appreciated by one of ordinary skill in the art to operate satisfactorily for an intended purpose. Similarly, words of approximation such as “about,” “approximately,” or “substantially” when used in reference to physical characteristics, should be understood to contemplate a range of deviations that would be appreciated by one of ordinary skill in the art to operate satisfactorily for a corresponding use, function, purpose, or the like. Ranges of values and/or numeric values are provided herein as examples only, and do not constitute a limitation on the scope of the described embodiments. Where ranges of values are provided, they are also intended to include each value within the range as if set forth individually, unless expressly stated to the contrary. The use of any and all examples, or exemplary language (“e.g.,” “such as,” or the like) provided herein, is intended merely to better illuminate the embodiments and does not pose a limitation on the scope of the embodiments. No language in the specification should be construed as indicating any unclaimed element as essential to the practice of the embodiments.

In the following description, it is understood that terms such as “first,” “second,” “top,” “bottom,” “up,” “down,” and the like, are words of convenience and are not to be construed as limiting terms unless specifically stated to the contrary.

The present teachings relate generally to the field of identity, authentication, and authorization. More particularly, aspects of the present teachings relate to the assignment, distribution, allocation, authentication, and authorization of cryptographic keys and identities in cryptographic applications such as in blockchains, decentralized systems, and the applications and software built that take advantage of them, which may also be referred to as “Web3.”

A great deal of investment in terms of human and financial capital in recent times is being deployed in the domain of blockchain and Web3, at least in part because of the advantages of decentralization, which include transparency in the system of records. These blockchains can be public or private depending upon the business context. The blockchain and Web3 applications and systems have been ordinarily designed in such a way that an individual or entity can be a participant by possessing and proving their digital identity on the networks. This identity is often implemented using mathematical and/or cryptographic methods wherein a participant in possession of cryptographic “keys” is able to prove their identity and authorize transactions, without actually revealing the keys.

Those skilled in the art appreciate that, despite the known advantages of blockchain and Web3—and the many applications, systems, and protocols that are being built to take advantage of the blockchain and Web3 aspects—roadblocks to large scale adoption by the general public may include getting users to safely own and manage their digital identity via owning and managing their cryptographic private keys.

In blockchains, and Web3, it is possible to transfer digital assets, tokens, and currency to a user, if you know their public identity, which is often referred to by those skilled in the art as a public address. This is similar to transactions involving conventional assets, where we generally have the ability to send money to any bank account, Venmo account handle, or similar, by knowing account details that are not considered highly sensitive information (since knowing the just the account details, one generally cannot withdraw funds without proof of authorization from the actual owner).

Therefore, on blockchain and Web3 systems, safely managing a user’s private key may be particularly important, as disclosing the private key information to an adversary or bad actor can be equivalent to granting total permission indefinitely to act on behalf of the user for, e.g., transferring out funds or assets of value owned by the user to anyone or anywhere, often without recourse, due to the automated, decentralized nature of the blockchains.

Software programs and digital platforms that are used to create and manage the private and public keys that govern the identities of users are colloquially called “crypto wallets” or “digital wallets.” Those skilled in the art are aware that there have been several attempts made thus far to enable creation and adoption of these crypto wallets, as easily and safely as possible, thereby enabling the creation and adoption of cryptographic digital identities widely. Some crypto wallet implementations such as Metamask (https://metamask.io/) require the user to download and install special software that securely creates, stores, and manages the cryptographic keys for the user. In some other implementations such as Coinbase (https://www.coinbase.com/), the user is expected to rely on a trusted third party to create, store, and manage cryptographic keys on their behalf. For these third parties to offer their services, they typically require the user to sign up with their e-mail address, phone number, social handles (such as Facebook or Twitter accounts), and the like. Some other third parties use more sophisticated techniques that are stronger than e-mail addresses and the like, to allow users to create, store, and manage their cryptographic identities.

In yet another type of implementation such as Magic (https://magic.link/) and Web3Auth (https://web3auth.io/), the user relies on third parties to facilitate interaction with blockchains, where computer techniques allow users to be (at least in theory) in sole custody of their private key. However, these implementations still have users state and prove ownership of their non blockchain identities such as their e-mail address, phone number, etc., before they are issued a digital identity via cryptographic keys for usage in blockchain environments.

In general, the user journey today is such that when a user is trying to use a Web3 or blockchain application, the application, at some point in the user’s journey, typically requires the digital identity of the user (e.g., their blockchain public address) in order to proceed. In one exemplary instance, a user may be trying to receive a nonfungible token (NFT, see https://en.wikipedia.org/wiki/Non-fungible_token) for their activity on a blockchain application (e.g., the user buying an event ticket with their credit card, which would be delivered to the user as an NFT). If the blockchain application does not know the user's blockchain public address, and if the user does not have a cryptographic identity (which may also or instead be referred to herein as a digital identity, as explained below), the blockchain application typically first requires the user to sign up for a service or software that gives the user a cryptographic identity and then informs the blockchain application of the public part of the cryptographic identity (i.e., their blockchain public address). Once a user signs up with the software, and obtains a cryptographic identity, they are able to use the blockchain application by providing the blockchain public address and continuing on their journey.

In aspects, teachings of the present disclosure may be applied to applications such as Pretty Good Privacy (PGP) based email security, where a platform practicing teachings of the present disclosure may offer a sending user the second cryptographic secret (e.g., public key) belonging to a recipient, and vice versa. The platform may be responsible for storing and managing a first cryptographic secret (e.g., private key) of the receiver, which may be used by an application facilitating the email reception to decrypt the contents of the message by the receiver, perhaps after the platform verifies the authentication of receiver.

In yet other aspects, the teachings of the present disclosure may be applied to a platform and/or blockchain application that may be used by two communicating parties to set up a secure communication where a symmetric/asymmetric key pair is exchanged between the parties and subsequent communication is performed directly between the two communicating parties without any intermediaries in a peer-to-peer fashion using the established new symmetric/asymmetric key pairs.

More specific examples of existing platforms and their problems will now be described.

As described previously, blockchain software applications may rely on systems that offer cryptographic proof (e.g., signatures and/or certificates) of a user's digital identity (e.g., cryptographic keys and/or root certificates). Such systems that offer cryptographic proof of a user's digital identity may rely on systems that offer cryptographic proof of user's real world or Web2 identity such as proof of ownership of an email, phone number, biometrics, or device (such as via WebAuthn, or certificates that may be saved in secure enclave of a device). Further, such systems that offer cryptographic proof of a user's real world or Web2 identity may in turn rely on other trusted parties to verify a user's ownership of one or more Web2 identities. In one instance, a system that offers cryptographic proof of user's real world or Web2 identity could be AWS Cognito (https://aws.amazon.com/cognito/), which verifies a user's identity, and a trusted party could be Google (see material related to "Sign In With Google"), which verifies that the user is indeed the rightful owner of their non-blockchain identity such as an email provided to the user by Google. In this example, AWS Cognito could derive the proof of ownership of the user's email based on proof or attestation submitted to the system that incorporates, among other things, the cryptographic proof made available by the "Sign In With Google" service by Google, which is the ultimate identity verifier in this example. In other instances, a trusted party may include a biometric identity authentication provider, where the biometric identity provider is able to attest to the real world identity and/or presence of the user. Blockchain software may thus rely on intermediaries such as systems that offer cryptographic proof and other trusted parties to receive proof of a user's real world or Web2 identity, which will be used to give the user control to their cryptographic identity in the future, which may, in some cases, directly provide the ability to operate a cryptographic application (e.g., blockchain software, smart contracts, smart contract wallets, and the like). This cryptographic identity may then be created and/or managed via blockchain software and/or other software. In this manner, it will be understood that, generally, when discussing the creation, storage, and/or management of a cryptographic identity according to the present teachings, this can be done using "blockchain software" as that term is known in the art (e.g., software that lives and executes on a blockchain), and/or using other software such as regular (non-blockchain) software (e.g., that runs on a regular computer), blockchain connected software (e.g., parts of which being connected to the blockchain, but otherwise run on a regular computer), and so forth, and that the terms may be used interchangeably herein.

Systems that offer cryptographic proof may alternatively rely on direct verification of proof of a Web2 identity of a user based on one-time password (OTP) codes, magic links (see https://postmarkapp.com/blog/magic-links), on device (mobile phone, SIM card, smart card) embedded certificates or keys, and the like, instead of relying on other trusted parties for such proof. In one implementation, blockchain software may take on the responsibility of a system that offers cryptographic proof itself, without relying on an external party.

Having provided some context for the present teachings, more description of the present teachings is included below.

As used in this disclosure, it will be understood that a "blockchain application" may include any software or system that utilizes blockchain technology to provide a specific functionality or service. Also, or instead, a blockchain application as used herein may include applied cryptography software that uses a symmetric or asymmetric (public-private key pair) or distributed and/or decentralized (e.g., Multi Party Computation) cryptographic system, for example, including but not limited to software configured for sending end-to-end secure and/or encrypted messages. In general, blockchain technology is a distributed and decentralized ledger that records transactions across multiple computers, creating a transparent and immutable record of data. Blockchain applications can be built for various purposes across industries, including without limitation one or more of: cryptocurrencies that use blockchain technology to enable secure and transparent peer-to-peer transactions without the need for intermediaries like banks; smart contracts such as self-executing contracts with predefined conditions written into code that automatically execute and enforce the terms of an agreement when the specified conditions are met, where blockchain platforms can enable the development and deployment of smart contracts, allowing for decentralized applications to be built on top of them; supply chain management such as to track and verify the movement of goods in a supply chain, ensuring transparency and preventing fraud, where each step in the supply chain can be recorded on the blockchain, providing a reliable and immutable record of product origin, quality, and ownership; identity management for digital identities, permitting users to control their personal information and enabling the verification and authentication of identities without relying on centralized authorities; voting systems, where each vote can be recorded on the blockchain, ensuring accuracy, security, and the ability to audit the results; decentralized finance (DeFi) applications that aim to provide decentralized alternatives to traditional financial services, such as lending, borrowing, trading, and asset management, by leveraging smart contracts and decentralized protocols; and the like.

As used in this disclosure, an "entity" may include an individual person, an organization (e.g., a business, corporation, application, platform, government, and the like), and so on. An entity as used herein may also or instead include a piece of equipment and/or an object (such as a computing object, application, and so forth). An entity may have a unique identity within a platform or system according to the present teachings, and/or in communication therewith (such as a blockchain application).

An entity may include a user of a platform according to the present teachings. An entity may also or instead include a business, platform, program, system, or a service. An entity may further serve other entities/users. Thus, unless expressly stated to the contrary or otherwise clear from the context, the terms "entity" and "user" may be used interchangeably herein. However, it will also be understood that an entity may not necessarily be a user of a platform according to the present teachings; by way of example, an entity may be a user of another platform or blockchain application, where this other platform or blockchain application uses the services of the present teachings (e.g., where the blockchain application itself is a user of a platform according to the present teachings, but a particular user of the blockchain application is not themselves a user of the platform according to the present teachings). Further elaborating on this example, a user of the blockchain application may be an "entity" that has a "digital identity" that is created, retrieved, managed, etc., by an aspect of the present teachings, but that user themselves may not interact directly with a platform of the present teachings; in this manner, it will be understood that aspects of the present teachings may be "backend" systems for other platforms and applications. Following this, it is to be understood by those skilled in the art that "authentication by a user or entity" may not necessarily mean that the entity is directly presenting its own credentials to a platform or service practicing the teachings of this disclosure; for example, it may mean that the entity is relaying the authentication information of an underlying entity (e.g., authentication information linked to that of a user of a platform/entity) when the top level entity is interacting with the platform practicing the teachings of this disclosure, by way of example in aspects that require presentation of the authentication information by an entity to the platform practicing the present teachings.

As used in this disclosure, a "digital identity" may be synonymous with a "cryptographic identity" or a "cryptographically secure identity," and those terms may be used interchangeably herein, unless expressly stated to the contrary or otherwise clear from the context. A digital identity may utilize cryptographic techniques to establish and verify the identity of entities (as defined herein) in a secure and reliable manner. In traditional systems, identities are often based on personal attributes such as names, addresses, or social security numbers, which can be easily forged or stolen. Digital identities, on the other hand, leverage cryptographic algorithms and protocols to create and manage unique digital identities that may be expected to be resistant to tampering, forgery, or unauthorized access. Digital identities may involve the use of public key infrastructure (PKI) and digital certificates, where PKI relies on asymmetric encryption such that each identity is associated with a pair of cryptographic keys-a private key and a public key. The private key is securely maintained, while the public key is distributed and used to verify the owner's identity. When an entity wants to prove their identity in a cryptographic system, they can digitally sign a message using their private key. The signature can be verified by anyone who has access to the entity's public key, ensuring the integrity and authenticity of the message and establishing the entity's identity.

It shall further be understood that, in this disclosure, a "digital identity" may be used synonymously with a "public key" associated with the digital identity in aspects where it is relevant to a person skilled in the art, and that the "public key" may further be synonymously used with a "public address" and/or "wallet address" and/or "cryptographic keys" and/or "keys" even though the terms may not be technically equivalent. Thus, although in general implementation, a "public address" may not technically be exactly the same as a "public key"—rather the public address is generally a mathematical derivative of the public key—it shall be understood that when the "public address" is referred to in this disclosure, it shall also or instead include instances of the "public key" and vice-versa here and amongst other nomenclature (e.g., where "cryptographic keys" may include public-private key pairs), unless expressly stated to the contrary or otherwise clear from the context.

As used in this disclosure, a "unique identifier" may be something (e.g., data) associated with an entity that can identify a unique identity of that entity. That is, a unique identifier may be any identifying material representative of the unique identity of the entity. By way of example and not limitation, a unique identifier may include at least one of an email address, a phone number, a social security number, biometrics, and the like—e.g., in use cases where an entity is an individual. By way of further example and not limitation, a unique identifier may include a part number, a device identifier, and the like—e.g., in use cases where an entity is a piece of computing equipment and/or a computing object, and/or where the entity is an organization or individual, where a piece of computing equipment is associated with the entity. In aspects, a unique identifier may be an identifier (e.g., a digital certificate, or a cryptographic key) that acts as a proxy to a secondary unique identifier (e.g., biometrics such as an iris scan or fingerprint, such as where an iris scan or the like is processed and the data is flattened into a digitally unique fingerprint that is used to generate a unique key, that key and the fingerprint both also could be a unique identifier).

In general, a unique identifier disclosed herein may include a value or piece of information that uniquely identifies a particular entity. The unique identifier may serve as a means of distinguishing one entity from another and can be used to prevent confusion or ambiguity between entities. The unique identifier can be used for key identification (e.g., where unique identifiers are associated with public and private keys-thus, the unique identifier may be a key fingerprint or key ID), message identification (e.g., to identify and track individual messages or data units-thus, the unique identifier may be a message ID, sequence number, or the like that is assigned to a message to prevent duplication, detect replay attacks, and provide a means of ordering and organizing messages), user identification (e.g., to identify and/or authenticate users-thus, a unique identifier may be a username or user ID), transaction identification (e.g., a unique identifier may be associated with a transaction, such as where a unique identifier is a transaction hash), and so forth.

In aspects, the unique identifier of a user and the proof of unique identifier of the user may be the same. By way of example, this may include biometrics, where a fingerprint, retina scan, face scan, or the like may serve the role of both the unique identifier and proof of unique identifier. In an example implementation, a unique identifier may be biometrics of a user, and a digital identity (e.g., cryptographic public-private key pair or cryptographic attestation records) established by a verifier of biometrics that may serve as subsequent proof (by way of proxy) of a user owning the original biometrics. In yet other aspects, a unique identifier may be transiently presented by a platform (e.g., a platform according to the present teachings or a platform in communication therewith) and assigned to an entity. By way of example, a hospital might issue a temporary user name and password to a user in such a way that cryptographic secrets are issued against the user name (and optionally using any additional metadata presented) according to the present teachings, and/or a user name and password (and optionally using any additional metadata presented) may be used as the unique identifier. In aspects, the user name and password may be 'flattened' into a single user identifier, which is computationally hard to guess (e.g., a temporary or permanent GUID) the presentation of which may be assumed to satisfy the requirement of both a user identifier and proof of possession of the user identifier.

It will be understood that, in some aspects, the unique identifier and/or the unique identity of the entity may be truly unique. However, in other aspects, it is possible that the unique identifier and/or the unique identity of the entity may not be unique-such as where a username can be a unique identifier in a particular system, even though that same username may be utilized in another unaffiliated system. In aspects, a unique identifier may represent a plurality of entities that collectively have an identical identity (e.g., batch number, group number, group email address, group certificate, and the like). In yet some other aspects, a unique identifier may present itself as a unique identifier built into the entity at the time of its inception (e.g., a public-private key burnt into a cryptographic silicon chip embedded into an entity at the time of coming out of a manufacturing facility, or a semi-unique MAC address that is unique relative to a reasonable local setting).

The present teachings may follow from the insight that, in a plurality of cases, a blockchain application just needs a user's public address to serve immediate needs such as delivering NFTs to the user or transferring cryptocurrencies to the user, sending a secure message to a user, and the like. Thus, in a plurality of user flows, such as where the user receives blockchain-based assets (e.g., NFTs and/or cryptocurrencies) based on their activities outside of a blockchain (e.g., user purchasing tickets for a concert), a blockchain application may simply need a user's public address. Similarly, in cases where a user's Web2 identity is already known to the application, it can add a lot of friction in the user experience of the blockchain application to force a user to first sign up for a digital wallet, a process that creates and establishes a cryptographic identity for a user, possibly based on a non-blockchain identity.

The present teachings may therefore allow a blockchain application to obtain blockchain public addresses of a user without the user having to sign up for a digital identity, thus significantly simplifying the user experience. Additionally or alternatively, by way of example, in one implementation, a blockchain application may rely on certain software via a backend API request to let it know that a blockchain public address exists relating to a user based on an identity, which may be non-blockchain based, where such software may be run as a platform according to the present teachings and/or on a system according to the present teachings. In this example, no interaction may be required on part of the user, which again can significantly simplify the user experience.

In certain aspects, a blockchain public address may be generated by a platform according to the present teachings based on a non-blockchain identity (aka a Web2 or real world identity) known to belong to a user, and/or via a non-blockchain identity given to a blockchain application by the user. The verification that the user actually owns the non-blockchain identity may be deferred to a later point in a user's user journey, such as when the proof of ownership of the digital identity may be required by the blockchain application. By way of example, in one implementation, verification of a user's non-blockchain by the platform or by the blockchain application identity happens at the time of the user having to digitally sign a blockchain operation, which may be referred to colloquially as "signing a transaction."

In one aspect, when a blockchain application requests a blockchain digital identity for a user under consideration, whose digital identity is linked to the user's non-blockchain identity, the platform may not need to verify that the user is indeed a direct customer of the blockchain application or that the user/entity under consideration actually owns or is otherwise associated with the non-blockchain identity as claimed by the blockchain application. This can be done because it may be the case that the blockchain public address is not necessarily a secret, instead the cryptographic identity (which, in aspects, may be the private key) may be a secret, as it is mathematically intensive to derive the cryptographic identity from the public address.

An aspect of the present teachings includes the use of an algorithm running on a software as a service platform, where the algorithm determines what a usable blockchain public address for a non-blockchain identity for an entity may be. Then, the algorithm determines whether a cryptographic identity exists for the non-blockchain identity. If so, the platform may return the blockchain public address (i.e., the public portion of the digital identity); if not, the platform may generate a cryptographic identity, which may be linked to the user's non-blockchain identity, which can be taken possession of via the non-blockchain identity.

The above-described aspect may further include a consent/confirmation prompt. For example, if a cryptographic identity exists for the non-blockchain identity, the platform may get the entity (e.g., a user) to consent to share the blockchain public address with the requesting platform. And, when such consent is granted, the platform practicing the teachings of the disclosure may return the blockchain public address. Thus, at the point in time in the future when an application may require the proof of possession of the cryptographic identity from the entity (e.g., sign a blockchain transaction), the application may rely on the platform to provide the proof (e.g., complete the signing of the presented blockchain transaction). The platform may then require that the entity prove the ownership of the non-blockchain identity, using techniques similar to those mentioned herein. At this point, the platform may use the opportunity to prompt the entity to confirm (or add if one does not exist) an additional, alternative, replacement, and/or complementary non-blockchain identities for the entity such as a time-based one-time password (TOTP) code, an authentication scheme such as WebAuthn, an additional phone number or email address, and/or the like.

Another example workflow of the present teachings may include a blockchain application requesting a platform according to the present teachings to sign a "transaction" to prove possession of a cryptographic identity to the blockchain, perhaps to transfer a digital asset that they own to a third party. In this instance, the platform according to the present teachings may force a user to prove that they own the non-blockchain identity, which may be done by any means described herein. In aspects, processing on the platform may include a consent flow describing to the user what is going to happen, as part of signing the transaction, to approve a transaction initiated by the blockchain application. Thus, a technique may include obtaining a non-blockchain identity for a user (e.g., email), where this may be supplied by a blockchain application; obtaining proof of ownership of the non-blockchain identity by the user; and signing a transaction for the user from the blockchain application, based on proof of the non-blockchain identity from the blockchain application. Then the process may return back to the blockchain application.

In certain aspects, the present teachings include incorporating a consent/descriptive dialog into the workflow, e.g., as part of informing the user of what they are agreeing to. The non-blockchain identity can include a plurality of identifiers (e.g., email address, Authenticator signature (Hardware Security Key), and so on) such that some or all of them may need to be satisfied before a cryptographic identity may be generated/managed based on proof of some or all of the non-blockchain identity. In one implementation, the blockchain application may generate the cryptographic identity and delegate a platform according to the present teachings to be a responsible party for safekeeping and/or management of the cryptographic identity such that the blockchain application may obtain access to the user's cryptographic identity via the platform, based on the non-blockchain identity specified by the blockchain application and/or the user. Thus, a workflow may include receiving a transaction signing request from a blockchain application at a platform according to the present teachings; getting consent from a user (e.g., description of the transaction); obtaining the non-blockchain identity for the user (e.g., email), which could be supplied from the blockchain application; obtaining proof of ownership of the non-blockchain identity by the user; signing the transaction for the user from the platform according to the present teachings, based on proof of the non-blockchain identity from the blockchain application; and then returning to the blockchain application.

The present teachings may include the creation and management of a cryptographic identity generated by a blockchain application for a user based on a non-blockchain identity. When at a later point in time, the blockchain application may require a user to sign a transaction using their cryptographic identity, the blockchain application may invoke a platform according to the present teachings (or other software) to sign the transaction through the user. The platform, at this point, may have the user prove ownership of the non-blockchain identity. Throughout certain implementations, while the platform/software may be an independent external party, it could also be a software or systems for generating and/or managing identities within the blockchain application's infrastructure (e.g., a private key management software) or an embedded module/library/SDK. Thus, a workflow may include use of a blockchain application; creation of a cryptographic identity for a user (e.g., tied to the user's non-blockchain identity); storing the cryptographic identity and the non-blockchain identity (e.g., on software on a platform according to the present teachings) for management; and continuing use of the non-blockchain identity for the user on a blockchain application.

The present teachings may include how, at a point in time in the future, a blockchain application may rely on the present teachings to sign transactions for a user. The platform according to the present teachings may use a plurality of techniques to prove that a user owns a non-blockchain identity before signing the transaction; incorporating elements described above in the user's journey may optionally include a consent or confirmation dialog, all in accordance with a representative embodiment.

In one example implementation, a platform practicing aspects of the present disclosure may, upon request from a blockchain application or the like, generate plurality of cryptographic secrets linked to the supplied user identifier in the request through communication amongst a network of systems the platform relies on that may independently, individually, or collectively practice aspects of the present disclosure.

In one example implementation, an application may be a platform to allow people to send cryptocurrency to anyone relying on blockchain. If a first user of the application wants to send cryptocurrency to a second user identified with their Web2 identity (e.g., email) supplied by the first user, where the second user may not be a user of the application, the application may rely on the present teachings, or rely on plurality of applications or platforms practicing aspects of present teachings, to assign a cryptographic identity to the second user and receive a public address corresponding to the second user. The application can now allow the first user to send cryptocurrency to the second user identified by their non-blockchain identity and commit the transaction on the blockchain with the recipient address. The present teachings may further allow the second user to send their received cryptocurrency elsewhere using either the application or another application where the second user is able to take control of their blockchain identity by first proving that they own the non-blockchain identity. Therefore, a workflow according to an aspect of the present teachings may include use of a blockchain application; receiving, at a platform according to the present teachings, a transaction signing request from the blockchain application; obtaining a non-blockchain identity for a user (e.g., email), which could be supplied by the blockchain application; obtaining proof of ownership of the non-blockchain identity from the user; signing the transaction for the user from the blockchain application, based on proof of the non-blockchain identity from the blockchain application; and returning to the blockchain application.

FIG. 1 shows a system for digital identity allocation, assignment, and management, in accordance with a representative embodiment. In general, the system 100 may include a networked environment where a data network 102 interconnects a plurality of participating devices and/or users in a communicating relationship. The participating devices may, for example, include any number of user devices 110, remote computing resources 120, other resources 130, and databases 140. The system 100 may further include a platform 150 that is structurally and programmatically configured to allocate, assign, and/or manage a digital identity 152 of one or more users 101 of the system 100, where, as stated above, a user 101 may include an entity such as an individual, a business entity, government entity, and so forth.

The data network 102 may be any network(s) or internetwork(s) suitable for communicating data and information among participants in the system 100. This may include public networks such as the Internet, private networks, telecommunications networks such as the Public Switched Telephone Network or cellular networks using third generation (e.g., 3G or IMT-2000), fourth generation (e.g., LTE (E-UTRA) or WiMAX-Advanced (IEEE 802.16m)), fifth generation (e.g., 5G), and/or other technologies, as well as any of a variety of corporate area or local area networks and other switches, routers, hubs, gateways, and the like that might be used to carry data among participants in the system 100.

Each of the participants of the data network 102 may include a suitable network interface comprising, e.g., a network interface card, which term is used broadly herein to include any hardware (along with software, firmware, or the like to control operation of same) suitable for establishing and maintaining wired and/or wireless communications. The network interface card may include without limitation a wired Ethernet network interface card ("NIC"), a wireless 802.11 networking card, a wireless 802.11 USB device, or other hardware for wired or wireless local area networking. The network interface may also or instead include cellular network hardware, wide area wireless network hardware or any other hardware for centralized, ad hoc, peer-to-peer, or other radio communications that might be used to connect to a network and carry data. In another aspect, the network interface may include a serial or USB port to directly connect to a local computing device such as a desktop computer that, in turn, provides more general network connectivity to the data network 102.

The user devices 110 may include any devices within the system 100 operated by one or more users 101 for practicing the techniques as contemplated herein. Specifically, the user devices 110 may include any device for interacting with components of the system 100 such as the platform 150 according to the present teachings and/or one or more other resources 130 such as a blockchain application. The user devices 110 may also or instead include any device for managing, monitoring, or otherwise interacting with tools, platforms, and devices included in the systems and techniques contemplated herein. The user devices 110 may be coupled to the data network 102, e.g., for interaction with one or more other participants in the system 100, such as the platform 150 or a component thereof. In some aspects, the user device 110 itself may be an "entity" as described herein, where the user device 110 can have its own associated digital identity 152. In certain aspects, the user device 110 may be a computing device or other device that interacts with the platform 150 through an intermediary, e.g., one or more other resources 130 such as a blockchain application.

By way of example, the user devices 110 may include one or more desktop computers, laptop computers, network computers, tablets, mobile devices, portable digital assistants, messaging devices, cellular phones, smartphones, portable media or entertainment devices, or any other computing devices that can participate in the system 100 as contemplated herein. As discussed above, the user devices 110 may include any form of mobile device, such as any wireless, battery-powered device, that might be used to interact with the networked system 100. It will also be appreciated that one of the user devices 110 may coordinate related functions as they are performed by another component such as one of the remote computing resources 120, other resources 130, and/or the platform 150.

Each user device 110 may generally provide a user interface (included on a display 112 thereof), such as any of the user interfaces described herein. The user interface may be maintained by a locally executing application on one of the user devices 110 that receives data from, e.g., the remote computing resources 120, other resources 130, and/or the platform 150. In other embodiments, the user interface may be remotely served and presented on one of the user devices 110, such as where a remote computing resource 120, other resource 130, and/or the platform 150 includes a web server that provides information through one or more web pages or the like that can be displayed within a web browser or similar client executing on one of the user devices 110. The user interface may in general create a suitable visual presentation for user interaction on a display device of one of the user devices 110, and provide for receiving any suitable form of user input including, e.g., input from a keyboard, mouse, touchpad, touch screen, hand gesture, or other use input device(s).

The remote computing resources 120 may include, or otherwise be in communication with, a processor 122 and a memory 124, where the memory 124 stores code executable by the processor 122 to perform various techniques of the present teachings. More specifically, a remote computing resource 120 may be coupled to the data network 102 and accessible to the user device 110 through the data network 102, where the remote computing resource 120 includes a processor 122 and a memory 124, where the memory 124 stores code executable by the processor 122 to perform the steps of a method according to the present teachings. It will be understood, however, that the processor 122 and memory 124 as described herein, may also or instead be present on another participant in the system 100, such as a device associated with the platform 150. And, it will be generally understood that any of the functionality of the remote computing resource 120 or its components may also or instead be performed by another participant in the system 100, or vice versa, such as the platform 150.

The remote computing resources 120 may also or instead include data storage, a network interface, and/or other processing circuitry. In the following description, where the functions or configuration of a remote computing resource 120 are described, this is intended to include corresponding functions or configuration (e.g., by programming) of a processor 122 of the remote computing resource 120, or in communication with the remote computing resource 120. In general, the remote computing resources 120 (or processors 122 thereof or in communication therewith) may perform a variety of processing tasks related to cryptographic techniques and/or blockchain techniques as discussed herein. For example, the remote computing resources 120 may manage information received from one or more of the user devices 110, and provide related supporting functions, communicating with other resources 130, storing data, and the like. The remote computing resources 120 may also or instead include backend algorithms that react to actions performed by a user 101 at one or more of the user devices 110. The backend algorithms may also or instead be located elsewhere in the system 100. Also or instead, these processing tasks may be performed by the platform 150.

The remote computing resources 120 may also or instead include a web server or similar front end that facilitates web-based access by the user devices 110 to the capabilities of the remote computing resource 120 or other components of the system 100 such as the platform 150. A remote computing resource 120 may also or instead communicate with other resources 130 and/or the platform 150 in order to obtain information for providing to a user 101 through a user interface on the user device 110. Where the user 101 specifies certain criteria for processing, this information may be used by a remote computing resource 120 (and any associated algorithms) to access other resources 130. Additional processing may be usefully performed in this context such as recommending certain data processing operations and techniques.

A remote computing resource 120 may also or instead maintain, or otherwise be in communication with, a database 140 of content, along with an interface for users 101 at the user devices 110 to utilize the content of such a database 140. A remote computing resource 120 may also or instead be configured to manage access to certain content (e.g., for an enterprise associated with a user 101 of the user device 110). In one aspect, a remote computing resource 120 may manage access to a component of the system 100 by a user device 110 according to input from a user 101.

The other resources 130 may include any resources that may be usefully employed in the devices, systems, and methods as described herein. For example, the other resources 130 may include without limitation other data networks, human actors (e.g., programmers, researchers, annotators, editors, analysts, and so forth), sensors (e.g., audio or visual sensors), data mining tools, computational tools, data monitoring tools, databases, blockchain applications, and so forth. The other resources 130 may also or instead include any other software or hardware resources that may be usefully employed in the networked applications as contemplated herein. For example, the other resources 130 may include payment processing servers or platforms used to authorize payment for access, content or feature purchases, or otherwise. In another aspect, the other resources 130 may include certificate servers or other security resources for third-party verification of identity, encryption or decryption of data, and so forth. In another aspect, the other resources 130 may include a desktop computer or the like co-located (e.g., on the same local area network with, or directly coupled to through a serial or USB cable) with one of the user devices 110 or remote computing resources 120. In this case, the other resource 110 may provide supplemental functions for the user device 110 and/or remote computing resource 120. Other resources 130 may also or instead include supplemental resources such as scanners, cameras, printers, input devices, and so forth.

The other resources 130 may also or instead include one or more web servers that provide web-based access to and from any of the other participants in the system 100. While depicted as a separate network entity, it will be readily appreciated that the other resources 130 (e.g., a web server) may also or instead be logically and/or physically associated with one of the other devices described herein, and may, for example, include or provide a user interface for web access to a remote computing resource 120 or a database 140 in a manner that permits user interaction through the data network 102, e.g., from a user device 110.

The database 140 may store data used in the system 100, which may include by way of example any one of: a unique identifier 142, one or more cryptographic secrets 144 (e.g., public and/or private keys, and the like), encrypted and/or decrypted data, one or more digital signatures 146, metadata 148, digital identities 152, and/or the like. The database 140 may be a secure database, and may include by way of example any one of: a hardware security module, a software-based key store, a trusted execution environment (TEE), a secure element of a computing device (e.g., the user device 110), and/or the like.

It will be understood that the participants in the system 100 may include any hardware or software to perform various functions as described herein. For example, one or more of the user device 110, the other resources 130, and the platform 150 may include a memory 124 and a processor 122.

A use-case will now be provided by way of example to demonstrate an aspect of use of the system 100 of FIG. 1, although it will be understood that other use cases are also or instead possible. In an aspect, the system 100 includes a non-custodial crytography platform—e.g., the platform 150. When a unique identifier 142, such as a verifiable public identity (e.g., email address, phone number, social security number, or the like), belonging to a user 101 is initially provided to the platform 150—which may be through various means such as APIs or SDKs—the platform 150 may generate numerous cryptographic keys (e.g., the one or more cryptographic secrets 144), where any of which may be stored on a database 140, such as within a secure cryptographic silicon module (SCS), which is used in this example although other storage techniques (including those dependent or independent of the platform 150) are also or instead possible. These keys, which may include public-private key pairs, may then be securely and immutably linked to the user's 101 public identity. In an aspect, the SCS has the capability to execute limited predetermined computations as governed by the firmware, and it further maintains a local state. By design of the SCS, which may follow any of a plurality of industry standard secure cryptoprocessor implementations from various vendors, all operations performed by the SCS and the state of SCS may be insulated from external observability and interference.

Continuing with this example, in an aspect, the immutability of the binding of the cryptographic secrets 144 to the user 101 may be ensured by the platform 150. The data record governing this mapping may be created and referenced exclusively under the secure SCS, rendering it physically impossible to be maliciously altered by altering any external storage elements. If an attempt were to be made by any party to tamper with the data stores, the data may lose its integrity and/or become unusable, thus triggering the system 100 to recover from the last known verified good state. In an aspect, only the public components of these cryptographic secrets 144, commonly known as "wallet addresses," are exposed outside of the SCS. This exposure may occur when an application, utilizing the platform 150, requests public keys associated with known public user IDs of users 101.

Continuing with this example, in an aspect, to maintain optimal performance, the association of public addresses (public keys) to the user 101 may be stored and served from outside the SCS, employing a Tamper-Resistant Fast Caching (TRFC) infrastructure, where records may be insulated from malicious tampering through digital signatures and/or encryption techniques. Since the public addresses and public keys are non-sensitive data, this approach may help manage a significantly higher number of read-queries (e.g., 'getWallet' queries) efficiently by not having to be serviced by the SCS. Despite storing this non-sensitive 'public keys to user' linking data outside the SCS, the integrity and security of the stored information may remain unbreachable. This 'unbreachability' may stem from the platform's 150 TRFC operating on the immutable Secure Cache Record (SCR) records, which may be generated at the time of creation (i.e., 'minting') of the keys. A SCR may contain, among other things, a cryptographic integrity proof generated from a 'Primordial Key Set' minted at the genesis of the SCS, which proves the provenance of the record. Since there may be no external owner of the Primordial Key Set, and no one may know the actual private keys of the Primordial Key Set, a malicious SCR that could defeat an integrity check cannot be feasibly crafted by any entity. Moreover, the services relying on the TRFC to serve user queries may employ integrity and provenance checks to ensure the data from TRFC has not been tampered with. Should the validation fail, the system 100 may recover from the last known verified state.

Continuing with this example, in an aspect, to gain access to an operation requiring private keys, the user 101 may provide the SCS with the following, where again it will be understood that some or all of these steps may be optional and/or reordered. A 'Request' may be made to perform a permitted cryptographic task involving the keys, such as data signing or decryption, where the Request is raised by the user 101 directly or by developers of the application that the user 101 is interacting with, by calling SDK methods or API end-points. Next, an explicit 'Consent' to execute the above task may be made, where, for example, Consent is obtained from the user 101 as they interact with a consent dialog (or the like) presented by SDK methods, in response to the Request. The consent dialog may explain to the user 101 the action that the Request creator is intending to perform on their account. The process may continue with a freshly verified 'Proof' of ID of the user 101, to which the keys were initially linked, where cryptographic proof of the fact that the user 101 owns their public ID may be obtained, e.g., by relying on a relatively small immutable set of pre-approved industry standard authoritative ID verifiers (e.g., Google SSO, AWS Cognito, and the like). The SCS may verify the validity and freshness of the Proof, e.g., by referring to its internal tamper proof repository of public cryptographic keys that correspond to the provenance of the authoritative ID verifiers. Other metadata may be used for security purposes, where such metadata may be obtained through the continuous measurement of a plurality of datapoints corresponding to the user 101 and/or the environment and/or the infrastructure and/or the systems the user 101 is operating with.

Continuing with this example, the validation records described above may further be bound together cryptographically before they are sent to the platform 150 so that no part of the infrastructure is able to tamper with the validation records. The SCS, working in conjunction with firmware of the platform 150, may ensure that the private keys remain inaccessible if any of the above validation checks (e.g., task consent, proof) are not met. A security feature of the platform 150 may include maintaining private keys strictly within the security scope of SCS, which may be rigorously upheld by firmware of the platform 150 and may preclude any potential ways for the keys to be exposed outside the SCS. Consequently, it may be impossible for the platform 150, its staff, or any applications created or marketed via the platform 150 to gain access to keys of users 101 or other sensitive data such as funds tied to users' wallets created through the platform 150. Given the design of the SCS, even if an insider or a third party were to gain unauthorized privileged physical access to the system 100, they may be prevented from extracting any key information, even with forensic techniques. This level of security may mirror that provided by "hardware wallet" devices that those skilled in the art should be familiar with.

A similar example will now be provided. In this example, the process of securing proof of ID for the user 101 involves various pieces of infrastructure, starting with the user device 110 interacting with a resource such as a Authoritative Identity Verifier (AIV) through on-device SDKs as discussed above, by way of example. In an aspect, all network communications in the process occur exclusively over secure channels that may be expected to be impervious to interception, observation, or tampering. In this aspect, the AIV may be bound to, and may rely on, the platform's 150 Secure Identity Verification Orchestrator (SIVO) 154, which is configured to devise a suitable challenge-response mechanism on the basis of which AIV is able to issue a proof attesting that the user 101 possesses the identity instrument (e.g., the unique identifier 142). Despite the assurances provided by the AIV, the system 100 may safeguard against failures—as one example, even if the AIV infrastructure is compromised, the challenge-response mechanism administered by the SIVO 154 may still remain secure since the AIV may not have knowledge of the correct response until the user 101 themselves directly fulfills the challenge from the user device 110. The SIVO 154 may further have cryptographic attestations built into it, and/or may be architected as a stateless executable, retaining no data in the system's data stores, employing advanced cryptographic techniques to mitigate a threat of accidental data breaches.

In certain aspects, and continuing with this example, as yet another failsafe to ensure that the response in a challenge-response mechanism (e.g., an OTP code sent to email) is not predictable by any malicious entity, the SIVO 154 may rely on an off-board entangled/linked entropy independently bound to the SIVO 154, but one that remains inaccessible outside the SIVO security perimeter, in combination with an on-board entropy (e.g, a cryptographically secure random number generator, CSRNG) local to the SIVO 154 that work together via a cryptographic scheme to scramble the metadata beyond recognition as it transits AIV, even when identical OTP codes were employed between servicing two users 101. The communication between the SIVO 154 and user devices 110 to deliver the response (in the challenge-response mechanism) may occur through authoritative secure communication interconnects. For example, when the public ID is an email address, the interconnect facilitates the SIVO's connection to the authoritative mail server administering the user's email inbox. These interconnects may utilize encrypted secure network lines, mitigating the risk of man-in-the-middle threats.

In an aspect, to ensure comprehensive coverage across different geographic jurisdictions and diverse communication service providers, the platform 150 may use a pre-authorized set of independent Trusted Communication Interconnect Brokers (TCIBs). These TCIBs specialize in facilitating secure access to authoritative service providers, such as specific mail servers and mobile network service providers to whom the platform 150 might not have established a direct secure link. As a yet another failsafe in the event of interconnect or other compromise, the incorporation of cryptography-based multi-factor authentication (MFA) techniques by the user such as WebAuthn, Client Side Hardware Security Module, and TOTP may ensure the security of user accounts, since the MFA modules rely on the platform's 150 pre-established security primitives which include MFA. Therefore, the platform's redundant array of checks, balances, and fail-safes ensures that users maintain sole ownership and control over their cryptographic keys. This may provide that no entity, whether internal or external, can maliciously tamper with the infrastructure in a way that enables them to (A) forge the cryptographic proof of ID of a targeted individual wallet owner, or (B) bypass the cryptographic assertions that ensure the operational correctness and integrity of the entire infrastructure, or (C) steal or clone the cryptographic proofs of ownership of ID associated with individual wallet owners. Therefore, the platform 150, its affiliates, customers, or supply chain partners (e.g., AIVs) may be unable to tamper with or compromise the process of establishing proof of ID for the user 101, ensuring that users 101 have exclusive control over their cryptographic keys.

Figure 2:
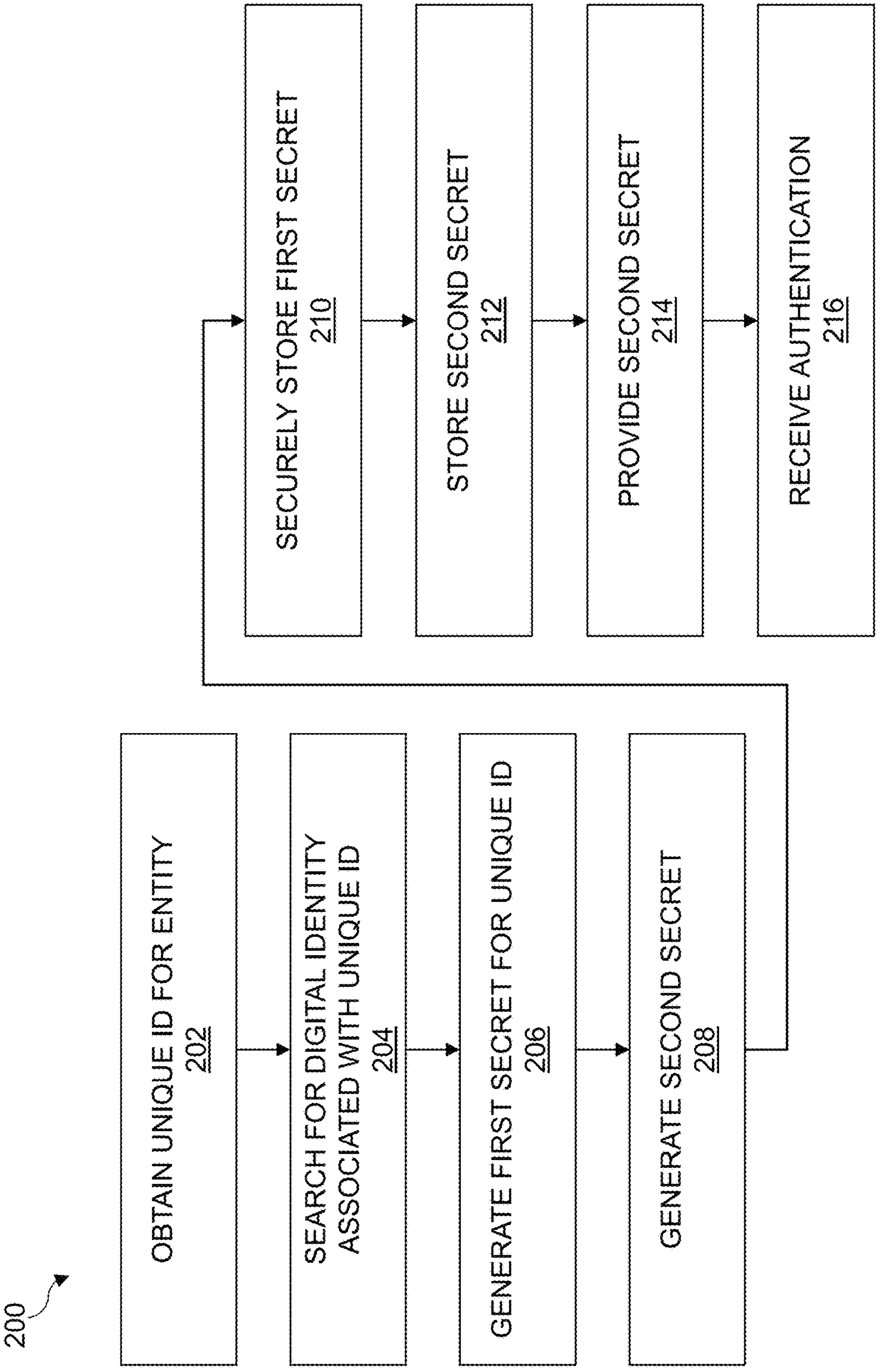
FIG. 2 is a flowchart of a method for digital identity allocation, assignment, and/or management, in accordance with a representative embodiment.

FIG. 2 is a flowchart of a method for digital identity allocation, assignment, and/or management, in accordance with a representative embodiment. In particular, the method 200 may include a technique for automatic digital identity creation (and/or retrieval, e.g., when a digital identity already exists)—for example, without requiring prior authentication by an entity—and/or usage of such digital identities. It will be understood that the method 200 may be implemented using a system (e.g., the system 100 described above with reference to FIG. 1) and/or a computer program product. Thus, in an aspect, a computer program product for automatically generating digital identities disclosed herein may include computer executable code embodied in a non-transitory computer readable medium that, when executing on one or more computing devices, performs one or more steps of the method 200.

As shown in step 202, the method 200 may include obtaining a unique identifier representing a unique identity of an entity. The entity may be any as described herein, including for example, an individual, an organization, a corporate entity, a user or non-user of a platform according to the present teachings, a user or non-user of a third-party platform such as a blockchain application (and/or a third-party platform that utilizes the services of a blockchain application or technique, or plans to in the future), a device (e.g., a user device or an entity device), an object, a system, and so forth. The unique identifier may be any as described herein, including for example, at least one of an email address, a phone number, a social security number, a username, a part number, a device identifier, and so forth.

Obtaining the unique identifier may be done without authentication of the unique identifier and/or the unique identity, e.g., without authentication (such as proof of ownership or other similar authentication) by the entity and/or any other entity. For example, obtaining the unique identifier may include retrieving the unique identifier on a platform, such as a platform according to the present teachings or a third-party platform (e.g., a blockchain application). This may include accessing one or more databases of content (such as any databases described herein) to retrieve the unique identifier. In some aspects, the unique identifier is received by a platform according to the present teachings, e.g., from a third-party platform. And in some aspects, a plurality of data is shared with a platform according to the present teachings, where the plurality of data includes one or more unique identifiers therein. In such aspects, obtaining the unique identifier may include searching a plurality of data for one or more unique identifiers, identifying one or more unique identifiers of interest, and retrieving these identifiers. Any of the aforementioned techniques for obtaining the unique identifier can be done without authentication by the entity whose unique identity is represented by the unique identifier, and/or without knowledge by the entity.

By way of example, the method 200 may be used to create and/or manage a digital identity for one or more users of a third-party platform such as a blockchain application or a platform utilizing services of a blockchain application. In this example, the third-party platform may share user information with a platform according to the present teachings, e.g., for the purpose of creating a digital identity for one or more users of the third-party platform. The method 200 may thus involve analyzing the shared user information to identify and extract unique identifiers for one or more users, and then creating a digital identity for these users using the extracted unique identifiers, which can be done without authentication (e.g., proof of ownership) by, or even the knowledge of, these particular users. By way of example, the method 200 may include automatically creating a digital identity by a platform according to the present teachings for any new user of the third-party platform or when triggered by a specific interaction between a user and the third-party platform. In this manner, a use case can involve a platform, using services according to the present teachings, that preemptively provides its users with digital identities so that these users can participate in, e.g., cryptocurrency transactions or the like.

As shown in step 204, the method 200 may include analyzing data to search for a digital identity associated with the unique identifier. Thus, the method 200 may include searching for a digital identity that may already exist for a particular unique identifier, and when such a digital identity exists, retrieving that digital identify for use and/or management. This step 204 may also or instead be used when an entity needs to exercise its digital identity, e.g., to sign a message and/or decrypt content. In this manner, the method 200 may include reviewing one or more databases to determine whether the unique identifier is already associated with a cryptographic secret. This can involve searching internal or external data for such existing digital identities, such that the method 200 avoids redundant creations thereof. In an aspect, when a digital identity already exists, that is what is used by the present teachings; and when a digital identity does not yet exist, one is automatically created using techniques described herein.

In aspects, a secure record (e.g., encrypted) digital identity for the user's unique identifier may be passed into the platform practicing the teachings such that the platform outsources the requirement to store the digital identity records under its custody, without necessarily disclosing the sensitive information contained in the digital identity. That is, in aspects, the first cryptographic secret does not necessarily need to be stored by the platform, but can be encrypted along with the unique identity with a cryptographic key known only to the platform and no one else, and allowed to be stored by any external party, including the blockchain application, or the user themselves, perhaps on their device or their cloud storage accounts (e.g., Google Drive). Thus, since the new encrypted record (that contains both the first cryptographic secrets and the user identifier linked to it) may be tamper proof, anyone can store it on their own, and only when the first cryptographic secret is needed, it may be submitted to the platform along with a cryptographic operation that needs to be performed with the first cryptographic secrets so that the platform may first decrypt the digital identity record using its own internal cryptographic key, extract the first cryptographic secret corresponding to the user, get the authentication of possession of the unique identity by a user that is linked to the digital identity, and subsequently perform the requested cryptographic operation using the unique identifier's first cryptographic secret as requested. Stated otherwise, in aspects, the first cryptographic secret (private key) does not necessarily need to be stored by the platform, but can be encrypted along with the unique identity (with a private key known only to the platform and no one else) and allowed to be stored by any external party, including the blockchain application, or the user themselves. And since the new encrypted record may be tamper proof, anyone can store it on their own and only when they need it to be used, they can submit it back to the platform along with an operation that needs to be performed with the private key so that the platform can first decrypt the record, extract the private key, get proof of the unique identity, and perform the requested cryptographic operation using the private key as requested.

As shown in step 206, the method 200 may include algorithmically generating a first cryptographic secret and associating the first cryptographic secret with the unique identifier. The first cryptographic secret may be any as described herein or known in the art, and for example, may include a private key. Thus, in an aspect, generating the first cryptographic secret may include generating a random number that is used to create the private key. In some aspects, the first cryptographic secret is derived from the unique identifier.

Generating the first cryptographic secret may include the use of metadata, which can be obtained from one or more of the entity and a user associated with the entity (e.g., where the entity is a third-party platform, and where a user of that platform generates or provides the metadata). The first cryptographic secret may thus be an executable based on metadata obtained from the entity or another source. The executable may be able to operate only upon furnishing proof of identity or ownership. The executable may also or instead be able to demonstrate to other executables (for example, on a blockchain application) while it operates that an operation performed by the executable is inspectable as being performed as the owner of a second cryptographic secret (e.g., public wallet address). That is, instead of an actual cryptographic key (because it will be understood that, in many aspects, the first cryptographic secret includes a private key), in some aspects, the first cryptographic secret may be a smart contract (e.g., a program, and/or a smart contract wallet) that is executed on a blockchain application. For example, when a proof of identity or ownership is passed into this smart contract, along with an operational instruction (e.g., digitally sign something, or perform a blockchain operation as the owner of the second cryptographic secret), this contract may perform the operation while demonstrating to other contracts on the blockchain that it is the owner of the second cryptographic secret. In this manner, the contract may have logic built into it in such a way that unless the caller is the lawful owner holding the proof, it would not respond. In other aspects, the first cryptographic secret may be distributed across a plurality of platforms following teachings of a schema such as Multi Party Computation (MPC) or Distributed Key Generation/Management where a group of systems or programs may work collaboratively as may be appreciated by those versed in the art, to perform a requested cryptographic operation by the user, with a net result that is equivalent to having a single first cryptographic secret on one platform performing an identical operation.

The first cryptographic secret may be one of a plurality of first cryptographic secrets generated and associated with the unique identifier. In this manner, each of the plurality of first cryptographic secrets may be used to algorithmically generate corresponding second cryptographic secrets. And, in certain implementations, each of the second cryptographic secrets is used to algorithmically generate corresponding third cryptographic secrets, and so on, where each of the "nth" cryptographic secrets can be defined as per this disclosure. Thus, it will be understood that the present teachings may include a deep recursive key association, such as for example in "Hierarchical Key Generation/Derivation" schemes, where, e.g., "Key 1 Private" generates "Key 2 Private" generates "Key 3 Private" who has a public "Key 3 Pub."

Association between the first cryptographic secret and the unique identifier may include one or more of: storage on a shared database, a digital ledger, a distributed computing network, a blockchain, and so forth. The association may be cryptographically bound using a scheme, e.g., a scheme including at least one of a digital signature algorithm and/or an encryption algorithm.

As shown in step 208, the method 200 may include algorithmically generating a second cryptographic secret for the first cryptographic secret. The second cryptographic secret may be configured to be publicly shareable. Thus, it will be understood that a "cryptographic secret" herein may not necessarily mean that it is secret. For example, the second cryptographic secret may not necessarily be a secret, e.g., the second cryptographic secret may be a public wallet address. The first cryptographic secret may be mathematically related to the second cryptographic secret to (i) decrypt data encrypted via the second cryptographic secret, and/or (ii) create a digital signature that is verifiable using the second cryptographic secret.

As shown in step 210, the method 200 may include securely storing the first cryptographic secret. The first cryptographic secret may be stored on a hardware security module. The first cryptographic secret may be stored in a software-based key store. The first cryptographic secret may be maintained in a trusted execution environment (TEE) for storage and processing thereof. In some aspects, the first cryptographic secret or its embodiment may be stored on a software or hardware component, or a secure element of a computing device associated with a user—e.g., where the computing device is a smartphone-which can be particularly convenient where the user is the entity.

As shown in step 212, the method 200 may include storing the second cryptographic secret (e.g., securely or otherwise). Although the second cryptographic secret generally may not need to be stored as securely as the first cryptographic secret, it will be understood that storing the second cryptographic secret may include any of the same or similar techniques described herein or otherwise known in the art to store the first cryptographic secret. Thus, in some aspects, the method may include securely storing the second cryptographic secret. In other aspects, the second cryptographic secret is stored in a database, which by way of example may be stored within the entity's purview, and which may be local or remote, secure or unsecure.

As shown in step 214, the method 200 may include providing the second cryptographic secret to a user (e.g., to the entity). It will be understood that, using the present teachings, this step 214 may not require any authenticating or proof of ownership.

As shown in step 216, the method 200 may include receiving authentication—which can include proof of ownership or any other form of authenticating—from the entity or another user authorized to do so (if the user is not the entity). This may occur after the creation of the first and/or second cryptographic secrets, which differs from many existing techniques in this technical field. That is, in certain implementations, authentication by the entity is deferred until use of the first cryptographic secret for either decrypting data encrypted via the second cryptographic secret and/or signing the digital signature. For example, the method 200 may include receiving authentication of the unique identifier by the entity when use of the first cryptographic secret is requested.

In some aspects, authentication includes the use of an authentication tool. The authentication tool may include one or more of a one-time password (OTP) provided to the entity, a prompt on a graphical user interface, establishing cryptographic proofs (for example, by using a hardware security module (HSM), biometrics, a smart card, and/or other cryptographic processing devices), and the like.

In some aspects, authentication includes use of a challenge. For example, the method 200 may include providing the entity with a computer-implemented challenge for authentication. Upon receipt of completion of the computer-implemented challenge, the method 200 may include performing the requested cryptographic operation (e.g., digitally signing a piece of data) in such a way that permits verification of the digital signature by the entity using the second cryptographic secret. As an optimization, the present teachings may not repeatedly challenge the entity if they have passed a challenge within a certain threshold timeframe and/or using a certain device—as an example, this can be based on a local state and/or token maintained on a computing device associated with the entity.

It is to be appreciated by those skilled in the art, for example in the techniques described herein such as the method 200 above or the method 300 below, that the first or subsequent cryptographic secrets may just be a virtual concept and may not necessarily exist as actual complete data records. This may thus include employing at least one of a plurality of cryptographic techniques such as distributed key generation/management, and/or multi-party computation (MPC), and/or blockchain programs (e.g., smart contract wallets). In this manner, it will be understood that a single entity/system or selection of entities/systems that correspond to a platform practicing the teachings of this disclosure may not necessarily generate all keys (cryptographic secrets) and/or hold any or all information that makes up the actual private key (or the first cryptographic secret) that represents a public key (or second cryptographic secret) for a unique identifier. In aspects, when a proof of ownership of a unique identifier is presented to a platform practicing teachings of this disclosure, along with a cryptographic operation to be performed, the selection of systems may work collaboratively (e.g., in the use case of system/systems practicing MPC) to together complete the requested cryptographic operation without necessarily having to be in possession of an actual first cryptographic secret.

Further, in aspects, a platform practicing the teachings of this disclosure may not store parts or all of the first or other cryptographic secrets. By way of example, the platform may return an encrypted and/or signed record of (first, or subsequent) cryptographic secrets associated with a user to the user or entity or blockchain application that requested the keys from the platform for the user.

Without limitation to the plurality of possible implementations, in one example, the platform may take the first and subsequent cryptographic secrets and encrypt and/or digitally sign the data with the user identifier, using the platform's own digital identity (cryptographic secrets), and return the secured secrets data of the user back to the entity/blockchain application that requested the digital identity of the user. This way, when a cryptographic operation (e.g., signing a blockchain transaction) is requested by a blockchain application for a user, this secured secret data is also provided by the application/entity connected to a platform practicing the teachings of this disclosure. The platform, upon receiving this information and after verifying the authentication information of the user, may decrypt the secured secrets data using its own private keys (i.e., first cryptographic secrets) and use the user's first cryptographic secret to perform the requested cryptographic operation (sign the transaction). In this example, the platform practing the present teachings may be able to therefore 'outsource' the burden of storing the secrets to another entity, without necessarily breaking the confidentiality of the cryptographic secrets belonging to the user.

The present teachings may also or instead be used to support techniques and systems for securing data and/or enabling the sharing of potentially sensitive information. It will be understood that these aspects of the present teachings may utilize any of the features described herein, such as the system 100 of FIG. 1 and/or the method 200 of FIG. 2. More detail regarding these aspects is provided below.

In an implementation, the present teachings may include a platform, software, distributed networked system, and/or a plugin/library embedded into a platform to allow entities to send secure messages to other entities. Examples of such messages can include but are not limited to a text, multimedia, binary object, an executable, and the like. In aspects, a "message" in this context may also or instead include another cryptographic key. For ease of understanding, and without limiting the scope of the teachings in this disclosure, the example application discussed below may include email software.

In aspects, if a first user of the application wants to send a message to second user of the application following a communication protocol, the application of the first user retrieves the identifier (e.g., email address) of the second user, and communicates with a platform that implements the teachings of this disclosure to obtain a publicly configured second cryptographic secret (e.g., a public key) belonging to the second user. The application then may use the second cryptographic secret of the second user to encrypt the message and send it to the account of the second user. This encrypted message may be retrieved by the second user's application for the second user's review. The second user's application, in communication with the platform implementing the teachings of this disclosure, may retrieve the original unencrypted message by requesting that the platform decrypt the message that is encrypted using the second cryptographic secret. This decryption may be performed after the platform authenticates the identifier or identity of the second user, either directly or by relying on metadata (e.g., authentication attestation) provided to the platform by the second application.

In aspects, and continuing with optional features for the example above, the first application may encrypt the message using an encryption key, and use the second cryptographic secret belonging to the second user to encrypt the encryption key. This encrypted message and the encrypted encryption key may then be transmitted to the second user. The second user, perhaps through their intent to view their message using their application with the application acting on their behalf, can then decrypt the encrypted encryption key to obtain the encryption key, which may then be used to retrieve the original message from the first user. Thus, in certain aspects, instead of encrypting a whole file using the present teachings, the user may employ the present teachings to encrypt the key (which may only be a small piece of data) that is used to encrypt the actual message.

In aspects, a first user may use a platform according to the present teachings to obtain the second cryptographic secret associated with the second user, and further use their (own) first cryptographic secret through the platform to generate a new cryptographic secret (e.g., a re-encryption key), where using this secret the first user may re-encrypt an already encrypted message owned by the first user. In this case, to use the first cryptographic secret, the user may present authentication information to the platform. This re-encryption may be facilitated by a re-encryption proxy application (which may be an independent application, or a part of the first application or its supporting infrastructure) as can be understood by those skilled in the art, which generally takes an encrypted message and re-encryption key to generate a re-encrypted message that can be decrypted by the first cryptographic secret of the second user, without the reencryption proxy application ever being exposed to the actual content of the message, or first cryptographic secrets of either parties. This new re-encrypted message may be transmitted to the second user. The second user may then view the message, perhaps facilitated by their application, by using the first cryptographic secret and/or the platform, similar to the example above. In this manner, the present teachings may be used with a "Proxy Reencryption Scheme," such as a technique with three users, A, B, and C—in this example, A sends an encrypted message to B so that only B can see it; and B can generate a re-encryption key, using C's public key (second cryptographic secret) and B's private key (first cryptographic secret), that allows B's application (or an independent service called Proxy Reencryption Service) to re-encrypt the original encrypted message so that only C can view it using their private key, without B or the Proxy Reencryption Service actually ever having to decrypt the original encrypted message.

In example aspects discussed above and elsewhere throughout the disclosure, it shall be understood that re-encryption of an encrypted message may also or instead be achieved by decrypting a message using first cryptographic keys of the second user and re-encrypting the message using the second cryptographic keys of a third user (e.g., using techniques which may include full data encryption where the complete data is encrypted, and/or key only encryption where only an encryption key of the data is encrypted, and so on as described elsewhere in this disclosure).

In yet some other example aspects, such as where the integrity and/or provinance of the message is important, and not necessarily the secrecy, the first user may digitally sign the message using the first cryptographic secret via a platform according to the present teachings. This may involve the first user submitting the authentication information of their identity (perhaps facilitated by the first application) to the platform, and then transmitting the signed message using a communication protocol to the second user using the second application. The second user, perhaps being facilitated by their application, may be able to verify the integrity and/or provinance of the message by retrieving the second cryptographic secret belonging to the first user through the platform.

In aspects, at least one of the encryption and/or digital signature techniques described above may be employed in secure message transmission. In an aspect, which will be understood to be applicable in broad industry verticals, the present teachings may be applied to transmit health and patient record information between medical service providers. As an example, consider a first medical service provider who keeps data records in association to a patient to provide the patient with medical services.

By way of example (e.g., using medical services as discussed above), a first service provider may obtain a second cryptographic secret corresponding to a second service provider using the unique identity of the second service provider, possibly using an application/platform implementing the present teachings. The first service provider may then secure the data (using at least one of encryption and/or signature schemes such as full data encryption and key only encryption) using the second cryptographic secret belonging to the second service provider. The second service provider, upon authenticating their identity with the platform practicing the present teachings, may use the first cryptographic secret to decrypt the data records. In some aspects, authentication of the identity may be established by authenticating a user belonging to the second service provider (e.g., a medical practitioner of second service provider may decrypt and access the data records in accordance with the second service provider's and/or the platform's access control policies, permissions, and/or roles). Authentication may also or instead be established via a smart card, biometrics, email, phone number, and the like.

By way of further example (e.g., using medical services as discussed above), the first service provider may obtain the second cryptographic secret corresponding to a patient using the unique identity of the patient (e.g., via a medical insurance data card such as those having a magnetic stripe and/or smart card, email, phone number, biometrics, and the like), such as using an application/platform implementing the present teachings. The first service provider may then secure the data (e.g., using at least one of encryption and/or signature schemes such as full data encryption and key only encryption) using the second cryptographic secret belonging to the patient. When the patient visits a second medical service provider, the patient may present sufficient authentication to the second medical service provider (e.g., using OTP codes, biometrics, and/or the like), which may be presented by the second medical service provider to the platform implementing the present teachings, which can decrypt and/or verify the data secured by the first medical service provider.

By way of further example (e.g., using medical services as discussed above), after data is secured by a first medical service provider, the authorized decryptor of the data (e.g., the patient or a second medical service provider) may further use aspects of the present teachings (e.g., those using proxy re-encryption such as encrypted file re-sharing) to delegate another entity (e.g., a user and/or a third medical service provider) to access the secure data. The third service provider may serve the patient, optionally by verifying their unique identifier (e.g., government ID), and may use their own authorization (e.g., employee email ownership and/or a smart card) to decrypt the secure message and fulfill the request of the patient.

Figure 3:
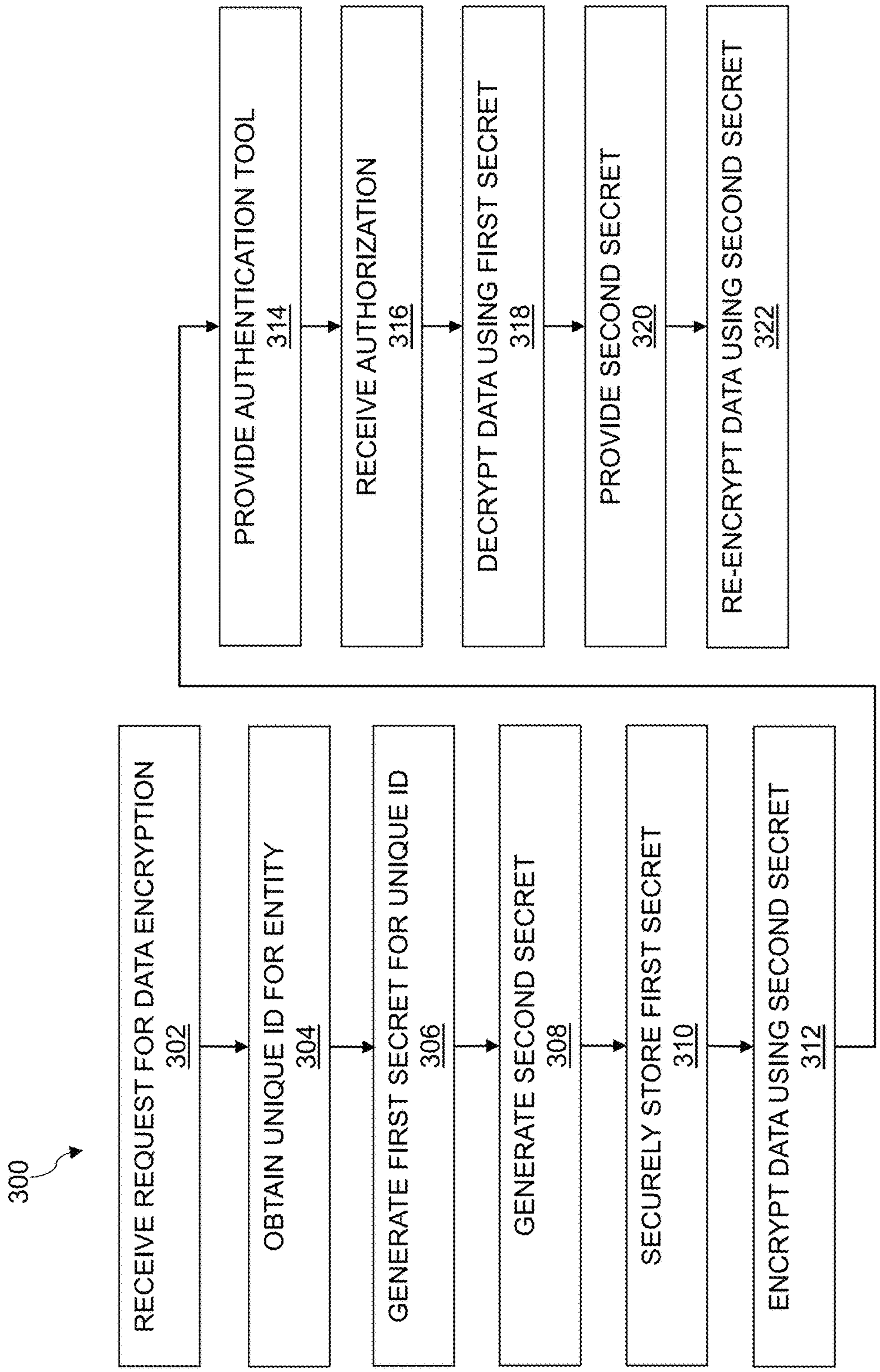
FIG. 3 is a flowchart of a method for digital identity management for data protection, in accordance with a representative embodiment.

FIG. 3 is a flowchart of a method for digital identity management for data protection, in accordance with a representative embodiment. More specifically, the method 300 may include techniques for the generation, allocation, assignment, and/or management of digital identities in a manner that can assist with data encryption, e.g., for the transmission of sensitive data between entities such as any as described herein (e.g., individuals, organizations, devices, and the like). It will be understood that the method 300 may be implemented using a system (e.g., the system 100 described above with reference to FIG. 1) and/or a computer program product. Thus, in an aspect, a computer program product for managing digital identities for data protection disclosed herein may include computer executable code embodied in a non-transitory computer readable medium that, when executing on one or more computing devices, performs one or more steps of the method 300.

As shown in step 302, the method 300 may include receiving a request for data encryption for securing data associated with an entity for transmission of the data from a sender to a recipient. The entity may be any as described herein, such as an individual, organization, or device. In an aspect, the entity is an individual and the data includes the entity's medical records. More generally, in certain aspects, the data includes medical records and at least one of the sender and the recipient includes a medical office.

As shown in step 304, the method 300 may include obtaining a unique identifier associated with the entity. In certain implementations, the unique identifier may be received without receiving an authentication action by the entity to authenticate the unique identifier. That is, in certain aspects, the method 300 (and/or a platform, device, or system practicing the method 300) may not require any authentication action to be performed by the entity to authenticate the unique identifier and/or possession thereof.

As shown in step 306, the method 300 may include algorithmically generating a first cryptographic secret and associating the first cryptographic secret with the unique identifier.

As shown in step 308, the method 300 may include algorithmically generating a second cryptographic secret for the first cryptographic secret. The first cryptographic secret may be mathematically related to the second cryptographic secret to decrypt data encrypted via the second cryptographic secret. The first cryptographic secret may also or instead be mathematically related to the second cryptographic secret to create a digital signature that is verifiable using the second cryptographic secret. As discussed herein, the second cryptographic secret may be configured to be publicly shareable.

As shown in step 310, the method 300 may include securely storing the first cryptographic secret.

As shown in step 312, the method 300 may include, before transmission of the data to the recipient, creating encrypted data by encrypting the data associated with the entity using the second cryptographic secret.

As shown in step 314, the method 300 may include, after transmission of the encrypted data to the recipient, providing an authentication tool for an entity to authorize decryption of the encrypted data using the first cryptographic secret. Thus, to access the first cryptographic secret, the platform may verify the authorization by authenticating the possession of the unique identifier by the entity associated with the data. The authentication tool may include a one-time password (OTP) for the entity, e.g., provided to or otherwise known to the entity. In this manner, authentication via the OTP may provide any permissions and/or authorizations for decrypting the encrypted data. The authentication tool may also or instead include a prompt on a graphical user interface.

As shown in step 316, the method 300 may include receiving an authentication by the entity using the authentication tool.

As shown in step 318, the method 300 may include, upon receipt of an authentication by the entity using the authentication tool, decrypting the encrypted data using the first cryptographic secret thereby providing the recipient with access to the data associated with the entity.

As shown in step 320, the method 300 may include providing the second cryptographic secret to the sender for encrypting the data associated with (or to be sent to) the entity.

As shown in step 322, the method 300 may include receiving the second cryptographic secret, and re-encrypting the data associated with (or to be sent to) the entity using the second cryptographic secret. Thus, this step 322 may include receiving a second cryptographic secret associated with a recipient of the encrypted data, and re-encrypting the data associated with the entity using the second cryptographic secret of the recipient. As such, it will be understood that the method 300 can be used for proxy re-encryption techniques.

The above systems, devices, methods, processes, and the like may be realized in hardware, software or firmware, or any combination of these suitable for a particular application. The hardware may include a general-purpose computer and/or dedicated computing device. This includes realization in one or more microprocessors, microcontrollers, embedded microcontrollers, programmable digital signal processors or other programmable devices or processing circuitry, along with internal and/or external memory. This may also, or instead, include one or more application specific integrated circuits, programmable gate arrays, programmable array logic components, or any other device or devices that may be configured to process electronic signals. It will further be appreciated that a realization of the processes or devices described above may include computer-executable code created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software. In another aspect, the methods may be embodied in systems that perform the steps thereof, and may be distributed across devices in a number of ways. At the same time, processing may be distributed across devices such as the various systems described above, or all of the functionalities may be integrated into a dedicated, standalone device or other hardware. In another aspect, means for performing the steps associated with the processes described above may include any of the hardware and/or software described above. All such permutations and combinations are intended to fall within the scope of the present disclosure.

Embodiments disclosed herein may include computer program products comprising computer-executable code or computer-usable code that, when executing on one or more computing devices, performs any and/or all of the steps thereof. The code may be stored in a non-transitory fashion in a computer memory, which may be a memory from which the program executes (such as random-access memory associated with a processor), or a storage device such as a disk drive, flash memory or any other optical, electromagnetic, magnetic, infrared, or other device or combination of devices. In another aspect, any of the systems and methods described above may be embodied in any suitable transmission or propagation medium carrying computer-executable code and/or any inputs or outputs from same.

The foregoing description, for purpose of explanation, has been described with reference to specific embodiments. However, the illustrative discussions above are not intended to be exhaustive or to limit the disclosure to the precise forms disclosed. Many modifications and variations are possible in view of the above teachings.

Unless the context clearly requires otherwise, throughout the description, the words "comprise," "comprising," "include," "including," and the like are to be construed in an inclusive sense as opposed to an exclusive or exhaustive sense; that is to say, in a sense of "including, but not limited to." Additionally, the words "herein," "hereunder," "above," "below," and words of similar import refer to this application as a whole and not to any particular portions of this application.

It will be appreciated that the devices, systems, and methods described above are set forth by way of example and not of limitation. For example, regarding the methods provided above, absent an explicit indication to the contrary, the disclosed steps may be modified, supplemented, omitted, and/or re-ordered without departing from the scope of this disclosure. Numerous variations, additions, omissions, and other modifications will be apparent to one of ordinary skill in the art. In addition, the order or presentation of method steps in the description and drawings above is not intended to require this order of performing the recited steps unless a particular order is expressly required or otherwise clear from the context.

The method steps of the implementations described herein are intended to include any suitable method of causing such method steps to be performed, consistent with the patentability of the following claims, unless a different meaning is expressly provided or otherwise clear from the context. So, for example performing the step of X includes any suitable method for causing another party such as a remote user, a remote processing resource (e.g., a server or cloud computer) or a machine to perform the step of X. Similarly, performing steps X, Y, and Z may include any method of directing or controlling any combination of such other individuals or resources to perform steps X, Y, and Z to obtain the benefit of such steps. Thus, method steps of the implementations described herein are intended to include any suitable method of causing one or more other parties or entities to perform the steps, consistent with the patentability of the following claims, unless a different meaning is expressly provided or otherwise clear from the context. Such parties or entities need not be under the direction or control of any other party or entity, and need not be located within a particular jurisdiction.

While particular embodiments have been shown and described, it will be apparent to those skilled in the art that various changes and modifications in form and details may be made therein without departing from the spirit and scope of this disclosure and are intended to form a part of the invention as defined by the following claims, which are to be interpreted in the broadest sense allowable by law.

What is claimed is:

1. A method for digital identity management with deferred authentication, the method comprising:
- obtaining an identifier associated with an entity without prior authentication of the entity;
- generating a first cryptographic secret associated with the identifier, wherein the generating occurs before authenticating the entity;
- algorithmically generating a second cryptographic secret cryptographically bound to the first cryptographic secret, the second cryptographic secret configured to be publicly shareable and capable of being provided without requiring authentication of the entity;
- securely storing the first cryptographic secret, wherein the securely storing includes using one or more of: a software-based key store or a hardware security module;
- deferring authentication of the entity until after receiving a request to perform a cryptographic operation using the first cryptographic secret;
- when receiving a request to perform the cryptographic operation using the first cryptographic secret, receiving authentication of the entity; and
- after verifying authentication of the entity, performing the requested cryptographic operation using the first cryptographic secret.

2. The method of claim 1, further comprising reviewing one or more databases to determine whether the identifier is already associated with a cryptographic secret before generating the first cryptographic secret.

3. The method of claim 1, wherein the first cryptographic secret comprises an executable configured to perform the cryptographic operation.

4. The method of claim 1, wherein:
- the first cryptographic secret comprises a virtual concept implemented across a selection of systems using at least one of: multi-party computation, distributed key generation, or blockchain programs, and
- the selection of systems works collaboratively to complete the cryptographic operation.

5. The method of claim 1, wherein the entity includes at least one of: a user, a device, a program, a system, a service, or a platform.

6. The method of claim 1, further comprising:
- receiving data intended for the entity;
- encrypting the data using the second cryptographic secret before authenticating the entity;
- storing the encrypted data; and
- upon authentication of the entity, decrypting the encrypted data using the first cryptographic secret and providing the entity with access to the data.

7. The method of claim 1, wherein the first cryptographic secret is generated based on the identifier.

8. A system for digital identity management with deferred authentication, the system comprising:
- one or more processors; and
- a memory communicatively coupled to the one or more processors, the memory storing instructions that, when executed by the one or more processors, cause the system to:
  - obtain an identifier associated with an entity without prior authentication of the entity;
  - generate a first cryptographic secret associated with the identifier, wherein the first cryptographic secret is generated before authenticating the entity;
  - algorithmically generate a second cryptographic secret cryptographically bound to the first cryptographic secret, the second cryptographic secret configured to be publicly shareable and capable of being provided without requiring authentication of the entity;
  - securely store the first cryptographic secret, including using one or more of: a software-based key store or a hardware security module;
  - defer authentication of the entity until after receiving a request to perform a cryptographic operation using the first cryptographic secret;
  - when receiving a request to perform the cryptographic operation using the first cryptographic secret, receive authentication of the entity; and
  - after verifying authentication of the entity, perform the cryptographic operation using the first cryptographic secret.

9. The system of claim 8, wherein securely storing the first cryptographic secret comprises storing the first cryptographic secret in at least one of: a hardware security module, a trusted execution environment, or a secure element.

10. The system of claim 8, wherein the memory further stores instructions that, when executed by the one or more processors, cause the system to review one or more databases to determine whether the identifier is already associated with a cryptographic secret before generating the first cryptographic secret.

11. The system of claim 8, wherein the first cryptographic secret comprises an executable configured to perform the cryptographic operation.

12. The system of claim 8, wherein:
- the first cryptographic secret comprises a virtual concept implemented across a selection of systems using at least one of: multi-party computation, distributed key generation, or blockchain programs, and
- the selection of systems works collaboratively to complete the cryptographic operation.

13. The system of claim 8, wherein the memory further stores instructions that, when executed by the one or more processors, cause the system to:

receive data intended for the entity;

encrypt the data using the second cryptographic secret before authenticating the entity;

store the encrypted data; and upon authentication of the entity, decrypt the encrypted data using the first cryptographic secret and provide the entity with access to the data.

14. The system of claim 8, wherein the entity includes at least one of: a user, a device, a program, a system, a service, or a platform.

15. A computer program product for digital identity management with deferred authentication, the computer program product comprising computer executable code embodied in a non-transitory computer readable medium that, when executing on one or more computing devices, performs the steps of:

obtaining an identifier associated with an entity without prior authentication of the entity;

generating a first cryptographic secret associated with the identifier, wherein the first cryptographic secret is generated before authenticating the entity;

algorithmically generating a second cryptographic secret cryptographically bound to the first cryptographic secret, the second cryptographic secret configured to be publicly shareable and capable of being provided without requiring authentication of the entity;

securely storing the first cryptographic secret, wherein the securely storing includes using one or more of: a software-based key store or a hardware security module;

deferring authentication of the entity until after receiving a request to perform a cryptographic operation using the first cryptographic secret;

when receiving a request to perform the cryptographic operation using the first cryptographic secret, receiving authentication of the entity; and after verifying authentication of the entity, performing the cryptographic operation using the first cryptographic secret.

16. The computer program product of claim 15, wherein the code further performs the step of reviewing one or more databases to determine whether the identifier is already associated with a cryptographic secret before generating the first cryptographic secret.

17. The computer program product of claim 15, wherein the first cryptographic secret comprises an executable configured to perform the cryptographic operation.

18. The computer program product of claim 15, wherein:

the first cryptographic secret comprises a virtual concept implemented across a selection of systems using at least one of: multi-party computation, distributed key generation, or blockchain programs, and the selection of systems works collaboratively to complete the cryptographic operation.

19. The computer program product of claim 15, wherein the first cryptographic secret is generated based on the identifier.

20. The computer program product of claim 15, wherein the code further performs the steps of:

receiving data intended for the entity;

encrypting the data using the second cryptographic secret before authenticating the entity;

storing the encrypted data; and upon authentication of the entity, decrypting the encrypted data using the first cryptographic secret and providing the entity with access to the data.

* * * * *